US011585789B2

(12) United States Patent
Prieur et al.

(10) Patent No.: US 11,585,789 B2
(45) Date of Patent: Feb. 21, 2023

(54) METHOD FOR DETECTING FAULTS IN PLATES

(71) Applicant: Halfwave AS, Hovik (NO)

(72) Inventors: Fabrice Prieur, Vettre (NO); Petter Norli, Oslo (NO)

(73) Assignee: Halfwave AS, Høvik (NO)

( * ) Notice: Subject to any disclaimer, the term of this patent is extended or adjusted under 35 U.S.C. 154(b) by 241 days.

(21) Appl. No.: 16/946,319

(22) Filed: Jun. 16, 2020

(65) Prior Publication Data
US 2020/0393416 A1    Dec. 17, 2020

(51) Int. Cl.
*G01N 29/04*    (2006.01)
*E21B 47/107*    (2012.01)

(52) U.S. Cl.
CPC ......... *G01N 29/041* (2013.01); *E21B 47/107* (2020.05)

(58) Field of Classification Search
CPC ......... G01N 29/041; G01N 2291/0427; G01N 2291/2636; G01N 29/069; G01N 29/11; G01N 29/343; G01N 29/348; G01N 29/38; G01N 29/42; G01N 29/4436; G01N 29/4445; G01N 29/043; E21B 47/107
See application file for complete search history.

(56) References Cited

U.S. PATENT DOCUMENTS

| 2007/0167133 A1* | 7/2007 | Tomlinson | G01N 29/07 455/39 |
| 2014/0208852 A1* | 7/2014 | Instanes | G01B 17/02 702/171 |
| 2021/0270777 A1* | 9/2021 | Hatahori | G01N 29/4445 |

FOREIGN PATENT DOCUMENTS

CN      102445496 A      5/2012

OTHER PUBLICATIONS

International-Type Search Report for Application No. NO 20190743, dated Mar. 10, 2020 (12 pages).
(Continued)

*Primary Examiner* — Xin Y Zhong
(74) *Attorney, Agent, or Firm* — Nixon Peabody LLP

(57) ABSTRACT

A method for detecting faults in plates includes the steps of: transmitting an acoustic signal towards the plate from a transmitting transducer, and receiving the acoustical signal from the plate in a receiving transducer. The receiving transducer is mounted at a distance from the transmitting transducer. The method includes the further steps of identifying zones of the plate wherein energy levels of the received signals are attenuated compared to other zones of the plate, and comparing the energy levels of the $A_2$ and $S_3$ guided Lamb modes in the received signals in the identified zones.

20 Claims, 2 Drawing Sheets

(56) References Cited

OTHER PUBLICATIONS

Tua, P. S. et al.; "Detection of cracks in plates using piezo-actuated Lamb waves", Smart Materials and Structures, vol. 13, No. 4, pp. 643-660; IOP Publishing Ltd., Bristol, United Kingdom; Aug. 1, 2004; XP020072470; ISSN: 0964-1726 (18 pages).
Liang Zeng et al.; "Excitation of Lamb waves over a large frequency-thickness product range for corrosion detection"; Smart Materials and Structure, vol. 26, No. 9, p. 95012; IOP Publishing Ltd., Bristol, United Kingdom; Aug. 9, 2017; XP020319183; ISSN: 0964-1726 (12 pages).
Seher, M. et al.; "Experimental Studies of the Inspection of Areas with Restricted Access using A0 Lamb Wave Tomography"; IEEE Transactions on Ultrasonics, Ferroelectrics and Frequence Control, IEEE, U.S, vol. 63, No. 9, pp. 1455-1467; Sep. 1, 2016; XP011622801; ISSN: 0885-3010 (13 pages).
Search Report for Norwegian Patent Application No. 20190743, dated Jan. 17, 2020 (2 pages).

\* cited by examiner

METHOD FOR DETECTING FAULTS IN PLATES

CROSS-REFERENCE TO RELATED APPLICATIONS

This application claims priority to and the benefit of Norwegian Application No. 20190743, filed Jun. 17, 2019, which is incorporated by reference in its entirety.

FIELD OF THE INVENTION

The present invention relates to a method for detecting faults in plates, such as the walls of pipelines for conducting oil and gas.

BACKGROUND

In the oil and gas industry, there is a need for efficient testing of pipelines. The pipelines are subject to wear from corrosive fluids and sand, and deformation from movements on the seabed or in the ground. Said pipelines are also prone to developing cracks, in particular near the welding seams. Welding seams are inherent weak points due to the changes of the steel structure caused by the welding process. Cracks may develop due to stress caused by temperature or pressure cycling, movements in the ground, coating disbondment, and consequent intrusion of mineral water to the areas under stress.

The structural integrity of pipelines may be tested using inspection pigs which travel inside the pipelines measuring the condition of the pipe wall. Acoustical transducers mounted on the pig are used for ultrasonic detecting of corrosion and cracks in the pipeline walls. A problem with present ultrasonic testing methods is that it is difficult to differentiate between indications of corrosion (thinning of the wall) and cracks. Even though corrosion must be considered an important factor affecting the health of the pipeline, cracks are considered to be more crucial for the pipeline, as a crack may develop and eventually cause a fatal breakdown of the pipe wall. Corrosion is handled in special ways, but cracks must be handled immediately. A scan of the pipeline wall may give an indication of the presence of a fault, but the pipeline must be physically engaged in order to determine the nature of the fault. This involves the replacement of a section of the pipeline. Often one then finds that the indicated fault is due to corrosion, which means that it was unnecessary to replace the pipeline section, as the corrosion could have been remedied in a less costly way.

SUMMARY OF THE INVENTION

It is an object of the present invention to devise a method for testing pipelines that may differentiate between faults caused by corrosion and cracks.

This is achieved in a method as claimed in the appended claims.

BRIEF DESCRIPTION OF THE DRAWINGS

The invention will now be described in detail in reference to the appended drawings, in which.

DETAILED DESCRIPTION

Figure 1:
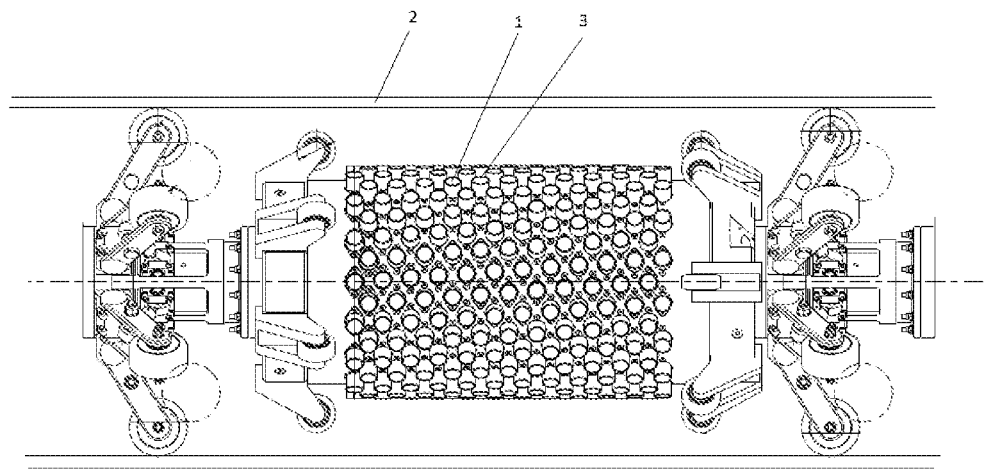
FIG. 1 is a view of the tool used for obtaining the measurements.

FIG. 1 shows the setup used in the present invention. The setup includes a cylindrical tool adapted for translatory movement inside a pipeline with wall 2. A number of transducers are mounted around the body of the tool. The transducers operate in pairs with an acoustical transmitting transducer 1 adapted to emit a pulsed signal towards the wall/plate 2 to be investigated. The signal from the transducer 1 will hit the wall at incident angles close to normal incidence and excite an acoustical signal in the wall. This signal will create waves that will be guided by the wall and that will propagate along the wall (Lamb waves). A part of this signal will leave the wall to be collected by a receiving transducer 3.

The signal emitted by the transmitting transducer 1 is a chirp (swept pulsetrain) covering a frequency range from 400 kHz to 1200 kHz.

This mean signal received from the wall is filtered into specific frequency bands each corresponding to a guided Lamb-mode. The specific modes of interest are the $A_2$ and $S_3$ modes, which correspond to the frequency ranges of 425-525 kHz and 650-750 kHz, respectively, in the present case where the wall thickness is 12.7 mm. It is important to note that the presented numbers for the frequency ranges are illustrative for the implementation of the method in the chosen case of a 12.7-mm thick steel wall. When applying the method to walls of different thicknesses the frequency numbers should be scaled so that the procut of the frequency and thickness is kept constant.

The energy of the signal received along the wall is estimated in each chosen frequency band and low energy zones are identified. Within these low energy zones characteristic of a fault, an area is defined in which the mean signal energy is computed as a function of time.

The analysis of the resulting signals involves first the identification of low energy zones, then the comparison of the mean energies for the $A_2$ and $S_3$ modes within a time window to indicate the state of the wall. The time window is located at a fixed time offset after the signal energy in the (total) received signal reaches its peak. The location of this window is chosen to maximize the absolute energy difference between the $A_2$ and $S_3$ modes in presence of a fault within a 50 µs time interval.

Figure 2:
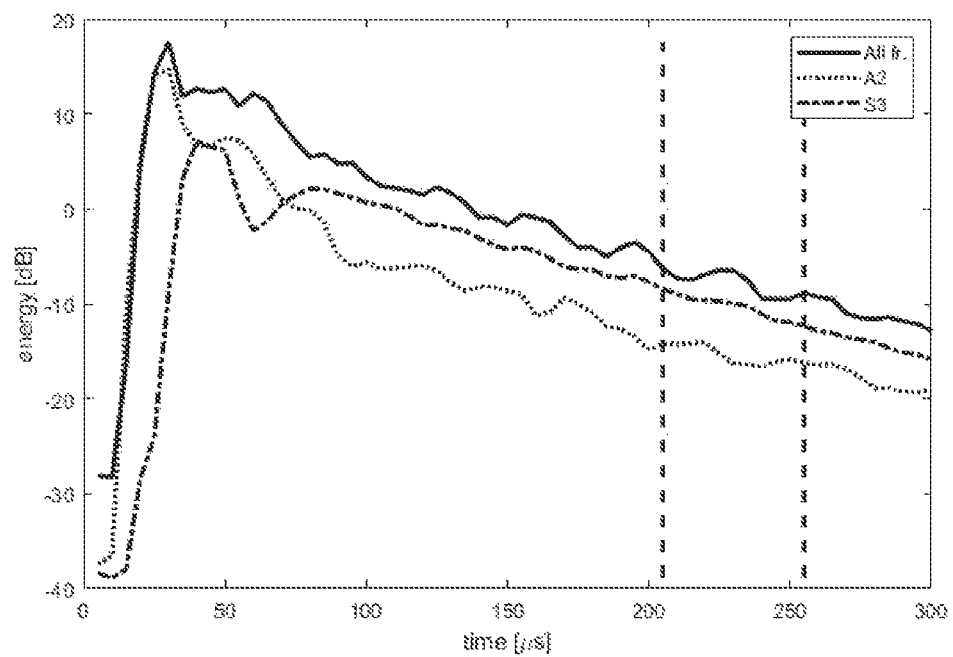
FIG. 2 is a diagram showing the energy of the received signal versus time for a clean wall without any fault.

FIG. 2 shows the resulting diagram from an analysis of a zone of the wall without any faults. The diagram shows the received energy of the unfiltered signal and for the $A_2$ and $S_3$ modes. The unfiltered signal peaks its energy at about 30 µs, and the comparison window is located between 205 and 255 µs, i.e. the window is located 175 µs behind the energy peak and is 50 µs wide, as indicated with the stippled vertical lines. The diagram shows that the unfiltered signal (marked "All fr" in the figure) received in the comparison window is attenuated about 20-25 dB from the peak, and that the energy received in the $A_2$ band is more attenuated than in the $S_3$ band. The energy difference is typically about 5 dB.

Figure 3:
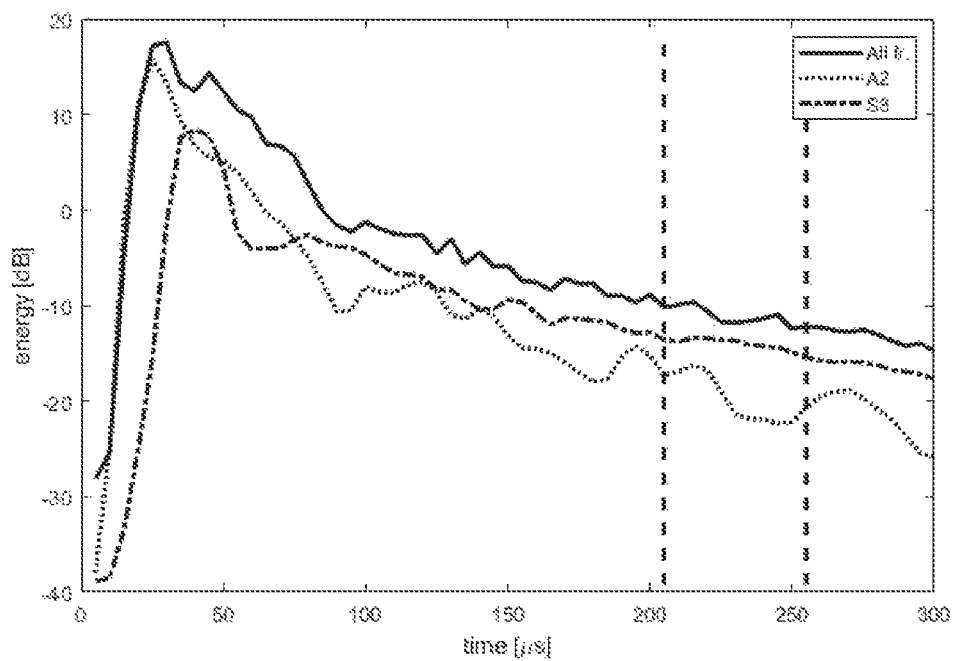
FIG. 3 is a corresponding diagram wherein the wall is pitted (corrosion).

FIG. 3 shows a corresponding diagram from a measurement taken from an area of pitting corresponding to an area of corrosion. In the comparison window, the total signal is attenuated further 4-5 dB compared with the signal from the fault-free zone in FIG. 2, and with the $A_2$ signal still about 5-8 dB lower than the $S_3$ signal.

Figure 4:
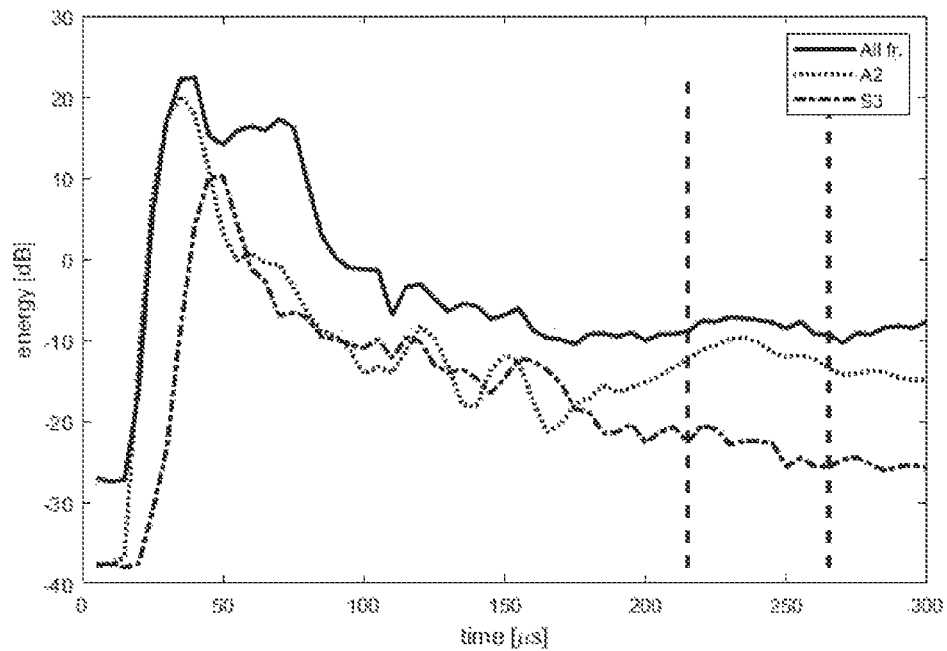
FIG. 4 is a corresponding diagram in the case of a wall with a large crack.

FIG. 4 shows a diagram obtained in a zone of the pipeline including a crack. The total signal is attenuated from the fault-free case in FIG. 2. However, in contrast with the case of a pitting, the diagram shows that energy of the $S_3$ mode in this case is lower than that of the $A_2$ mode in the comparison window. The $S_3$ mode is substantially more attenuated than the $A_2$ mode which is the opposite behaviour from what was observed in the two previous cases. Typically, the energy difference will vary between about 3 dB to 14 dB, dependent on the size of the crack.

Experience has shown that the size of the energy difference is dependent on the size of the crack (larger cracks mean larger energy difference), and also that clusters of cracks yield a large energy difference.

Thus, by using the inventive method, one may identify zones of cracking and corrosion/pitting, and clearly identify the nature of the fault.

While the description only relates to testing of pipelines, the same technique may be adapted for testing flat plates, although then with another tool setup.

The invention claimed is:

1. A method for detecting faults in a plate, comprising:
    transmitting an acoustic signal towards the plate from a transmitting transducer;
    receiving the acoustical signal from the plate in a receiving transducer, the receiving transducer being mounted at a distance from the transmitting transducer;
    repeating the steps of transmitting and receiving in a plurality of test points covering at least a part of the plate;
    identifying zones of the plate wherein energy levels of the received signals are attenuated compared to other zones of the plate; and
    comparing the energy levels of an $A_2$ guided Lamb mode to an $S_3$ guided Lamb mode in the received signals in the identified zones to determine whether a fault in the plate exists.

2. The method of claim 1, wherein the transmitted signal is a swept pulsetrain,
    the received signal is an unfiltered received signal, the unfiltered received signal is filtered into two separate frequency bands representing the $A_2$ and $S_3$ guided Lamb modes, respectively,
    a time window is applied to the filtered signals, wherein the time window is located at a predetermined time offset after a peak in a signal energy of the unfiltered received signal, and
    an energy level difference between the $A_2$ and $S_3$ mode signals is determined within the window.

3. A method according to claim 2, wherein the compared energy levels are mean energy levels within the identified zones.

4. A method according to claim 2, wherein frequency ranges used to filter out the $A_2$ and $S_3$ modes are scaled to various wall thicknesses by keeping a product of F and D (F×D) constant, wherein "F" is any mentioned frequency and "D" is a thickness of the plate.

5. A method according to claim 4, wherein the compared energy levels are mean energy levels within the identified zones.

6. A method according to claim 1, wherein the compared energy levels are mean energy levels within the identified zones.

7. The method according to claim 6, wherein the plate is part of an oil pipeline, a gas pipeline, or a pipeline carrying lightweight hydrocarbon products such as diesel, condensate, or liquefied natural gas.

8. The method according to claim 1, wherein the plate is part of an oil pipeline, a gas pipeline, or a pipeline carrying lightweight hydrocarbon products such as diesel, condensate, or liquefied natural gas.

9. The method according to claim 1, wherein the detected faults in the plate include corrosive pitting and cracks, wherein the energy levels of the $A_2$ and $S_3$ guided Lamb modes for corrosive pitting are different from the energy levels of the $A_2$ and $S_3$ guided Lamb modes for cracks.

10. The method according to claim 9, further including identifying a type of fault in the zone of the plate as being corrosive pitting or cracks based on the energy levels of the $A_2$ and $S_3$ guided Lamb modes that are received.

11. A method for detecting faults in a plate, comprising:
    transmitting an acoustic signal towards the plate from a transmitting transducer;
    receiving the acoustical signal from the plate in a receiving transducer, the receiving transducer being mounted at a distance from the transmitting transducer;
    repeating the steps of transmitting and receiving in a plurality of zones along the plate; and
    identifying a zone within the plurality of zones that has a fault by comparing energy levels of $A_2$ and $S_3$ guided Lamb modes in the received signals within the identified zone and energy levels of $A_2$ and $S_3$ guided Lamb modes in the received signals in another one of the plurality of zones.

12. The method of claim 11, where the transmitted signal is a swept pulsetrain,
    the received signal is an unfiltered received signal, the unfiltered received signal is filtered into two separate frequency bands representing the $A_2$ and $S_3$ guided Lamb modes, respectively,
    a time window is applied to the filtered signals, wherein the time window is located at a predetermined time offset after a peak in the signal energy of the unfiltered received signal, and
    an energy difference between the $A_2$ and $S_3$ mode signals is determined within the window.

13. A method according to claim 11, where frequency ranges used to filter out the $A_2$ and $S_3$ modes are scaled to various wall thicknesses by keeping a product of F and D (F×D) constant, wherein "F" is any mentioned frequency and "D" is the plate thickness.

14. A method according to claim 11, wherein the energy levels are mean energy levels.

15. The method according to claim 11, wherein the detected faults in the plate include corrosive pitting and cracks, wherein the energy levels of the $A_2$ and $S_3$ guided Lamb modes for corrosive pitting are different from the energy levels of the $A_2$ and $S_3$ guided Lamb modes for cracks.

16. The method according to claim 15, further including identifying a type of fault in the zone of the plate as being corrosive pitting or cracks based on the energy levels of the $A_2$ and $S_3$ guided Lamb modes that are received.

17. The method according to claim 11, wherein the plate is part of an oil pipeline, a gas pipeline, or a pipeline carrying lightweight hydrocarbon products such as diesel, condensate, or liquefied natural gas.

18. A method for detecting faults in a plate, comprising:
    transmitting an acoustic signal towards the plate from a transmitting transducer;
    receiving the acoustical signal from the plate in a receiving transducer, the receiving transducer being mounted at a distance from the transmitting transducer;

comparing energy levels of an $A_2$ guided Lamb mode to an $S_3$ guided Lamb mode in the received signals in an identified zone of the plate; and based on the comparing of the energy levels of the $A_2$ and $S_3$ guided Lamb modes in the received signals within the identified zone of the plate, determining whether a fault is present in the identified zone.

19. A method according to claim 18, wherein the energy levels of $A_2$ and $S_3$ guided Lamb modes are mean energy levels within the identified zone.

20. The method according to claim 18, further including identifying a type of fault in the identified zone as being a corrosive-pitting fault or a crack fault based on the energy levels of the $A_2$ and $S_3$ guided Lamb modes in the received signals.

* * * * *

UNITED STATES PATENT AND TRADEMARK OFFICE
CERTIFICATE OF CORRECTION

PATENT NO. : 11,585,789 B2
APPLICATION NO. : 16/946319
DATED : February 21, 2023
INVENTOR(S) : Fabrice Prieur et al.

It is certified that error appears in the above-identified patent and that said Letters Patent is hereby corrected as shown below:

On the Title Page

At Item (30) (Foreign Application Priority Data), please insert --Jun. 17, 2019 (NO) 20190743--.

Signed and Sealed this
Ninth Day of May, 2023

Katherine Kelly Vidal
*Director of the United States Patent and Trademark Office*